(12) United States Patent
Gerlach et al.

(10) Patent No.: US 11,998,957 B2
(45) Date of Patent: Jun. 4, 2024

(54) DEVICE FOR SPINNING A WORKPIECE

(71) Applicant: Solventum Intellectual Properties Company, Maplewood, MN (US)

(72) Inventors: Korbinian Gerlach, Gauting (DE);
Stefan K. Welker, Geltendorf (DE);
Christian A. Richter, Feldafing (DE);
Thomas K. Müller, Gauting (DE);
Bastian P. Kirchner, Fürstenfeldbruck (DE); Rudolf Schmid, Eichenau (DE);
Malte Korten, Moorenweis (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 138 days.

(21) Appl. No.: 17/309,909

(22) PCT Filed: Jan. 21, 2020

(86) PCT No.: PCT/IB2020/050455
§ 371 (c)(1),
(2) Date: Jun. 29, 2021

(87) PCT Pub. No.: WO2020/152587
PCT Pub. Date: Jul. 30, 2020

(65) Prior Publication Data
US 2022/0111424 A1   Apr. 14, 2022

(30) Foreign Application Priority Data

Jan. 24, 2019 (EP) ..................................... 19153432

(51) Int. Cl.
*B08B 7/00* (2006.01)
*A61C 13/00* (2006.01)
(Continued)

(52) U.S. Cl.
CPC ............ *B08B 7/00* (2013.01); *A61C 13/0013* (2013.01); *A61C 13/0019* (2013.01);
(Continued)

(58) Field of Classification Search
CPC ........... B08B 7/00; B08B 13/00; B08B 11/02; B29C 64/35; B33Y 40/20
(Continued)

(56) References Cited

U.S. PATENT DOCUMENTS 2,534,937 A * 12/1950 Wood ...................... B24B 47/06
91/335
2,647,349 A * 8/1953 Silven ..................... B24B 25/00
451/143

(Continued)

FOREIGN PATENT DOCUMENTS

CA           2941624           3/2018
CN       113302040 A *         8/2021 ......... A61C 13/0013
(Continued)

OTHER PUBLICATIONS

Translation of EP2216105 by Vidal, published Aug. 11, 2010 (Year: 2010).*
(Continued)

*Primary Examiner* — Stephen M Gravini
(74) *Attorney, Agent, or Firm* — Kevin Weber

(57) ABSTRACT

A device (1) for spinning a 3D printed workpiece (100). The device has a rotor (2) for spinning about a spinning axis (A) and a receptacle (8) for holding the workpiece (100). The receptacle (8) is pivotally attached to the rotor (2) for swiveling about a swivel axis (B) that is transverse to the spinning axis (A). The pivotal attachment enables swiveling of the receptacle (8) between a first angular orientation relative to the spinning axis (A) and a different second angular orientation relative to the spinning axis (A). The (Continued)

device (1) further has a balancing weight (9) that is movably arranged relative to the receptacle (8). The balancing weight (9) is lockable at different distances relative to the receptacle (8).

15 Claims, 9 Drawing Sheets

(51) Int. Cl.
    *B08B 11/02*     (2006.01)
    *B08B 13/00*     (2006.01)
    *B25J 9/04*     (2006.01)
    *B25J 19/00*     (2006.01)
    *B29C 64/35*     (2017.01)
    *B33Y 40/20*     (2020.01)

(52) U.S. Cl.
    CPC .............. *B08B 11/02* (2013.01); *B08B 13/00* (2013.01); *B25J 9/04* (2013.01); *B25J 19/002* (2013.01); *B29C 64/35* (2017.08); *B33Y 40/20* (2020.01)

(58) Field of Classification Search
    USPC ............................................................ 34/59
    See application file for complete search history.

(56) References Cited

U.S. PATENT DOCUMENTS

| | | | | |
|---|---|---|---|---|
| 2,937,444 | A * | 5/1960 | Kern | A61C 1/05 |
| | | | | 433/132 |
| 3,076,363 | A | 2/1963 | Hack | |
| 3,136,718 | A * | 6/1964 | Miller | D06F 49/003 |
| | | | | 210/368 |
| 4,180,074 | A * | 12/1979 | Murry | A61F 9/00745 |
| | | | | 604/118 |
| 7,621,861 | B1 * | 11/2009 | Kalember | A63B 22/14 |
| | | | | 482/79 |
| 10,189,057 | B2 | 1/2019 | Craft | |
| 10,254,499 | B1 * | 4/2019 | Cohen | B29C 64/321 |
| 2004/0051222 | A1 | 3/2004 | Cattell | |
| 2016/0311163 | A1 | 10/2016 | Yasukochi | |
| 2018/0161827 | A1 * | 6/2018 | Jasper | B08B 13/00 |
| 2019/0193148 | A1 | 6/2019 | Kiener | |
| 2019/0209264 | A1 | 7/2019 | Seo | |
| 2022/0111424 | A1 * | 4/2022 | Gerlach | B08B 7/00 |
| 2022/0160428 | A1 * | 5/2022 | Murray | A61B 34/32 |

FOREIGN PATENT DOCUMENTS

| | | | | |
|---|---|---|---|---|
| DE | 102015120211 | | 5/2017 | |
| DE | 102017115043 | | 1/2018 | |
| DE | 102016216839 | | 3/2018 | |
| EP | 2216105 | | 8/2010 | |
| EP | 3281729 | | 2/2018 | |
| JP | 2022517843 | A * | 3/2022 | |
| WO | WO2012021167 | A2 | 2/2012 | |
| WO | WO 2018-026640 | | 2/2018 | |
| WO | WO 2018-052226 | | 3/2018 | |
| WO | WO 2019-023120 | | 1/2019 | |
| WO | WO 2019-102304 | | 5/2019 | |
| WO | WO 2020-030338 | | 2/2020 | |
| WO | WO-2020152587 | A1 * | 7/2020 | A61C 13/0013 |

OTHER PUBLICATIONS

Translation of DE 102015120211 by Zippel, published May 24, 2017 (Year: 2017).*
Merriam-Webster Dictionary Definition of "Swivel" (Year: 2023).*
Extended EP Search Report for EP Application No. 19153432.0, dated Sep. 10, 2019, 4 pages.
International Search Report for PCT International Application No. PCT/IB2020/050455, dated Apr. 1, 2020, 7 pages.

* cited by examiner

1

DEVICE FOR SPINNING A WORKPIECE

CROSS REFERENCE TO RELATED APPLICATIONS

This application is a national stage filing under 35 U.S.C. 371 of PCT/IB2020/050455, filed Jan. 21, 2020, which claims the benefit of European Application No. 19153432.0, filed Jan. 24, 2019, the disclosure of which is incorporated by reference in its/their entirety herein.

FIELD OF THE INVENTION

The invention relates to a device for spinning a workpiece, in particular a dental workpiece, built up in an additive manufacturing process, in particular for cleaning the workpiece from at least some superfluous light hardenable material used for building up the workpiece.

BACKGROUND ART

In a variety of technical fields physical or mechanical workpieces are more and more manufactured by additive manufacturing processes (also further referred to as 3D printing herein).

Such additive manufacturing processes typically allow for building up a workpiece in its desired individual shape, by subsequently adding material to create that shape. So-called subtractive processes in which a workpiece is machined from an oversized blank by removal of material are more and more replaced by additive manufacturing processes.

While additive manufacturing processes are meanwhile widely used in the industry for rapid prototyping, the manufacturing of final products in many areas is still challenging. In particular for making dental restorations it is generally required to use materials that are compatible for use in a human body. Further, a dental restoration manufactured by a build-up process must fulfill requirements to mechanical stability as well as expectations about aesthetics, for example concerning color shading and translucency.

Some additive manufacturing processes are based on stereolithography. Stereolithography generally uses light for hardening light hardenable or photopolymerizable resins. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional workpiece is created by consecutively adding layers. Thereby, the pattern is controlled according to the desired outer shape of the three-dimensional workpiece.

Typically, at the boundary between the workpiece and the light hardenable material some of the light hardenable material resides on the workpiece after building up the workpiece. The light hardenable material typically resides on the workpiece in varying amounts, depending for example on the viscosity of the light hardenable material. This excess or superfluous material is generally undesired because it forms an additional structure on the actual shape of the workpiece and because the light hardenable material often is sticky, may contain undesired monomers and/or may (as such) not form a durable structure. Therefore, currently such residual light hardenable material is often post-cured to provide the workpiece with a solid surface. According to another approach the workpiece is cleaned mechanically or with aid of chemical solutions and optionally post-cured after.

Although existing approaches for cleaning workpieces that are made by additive manufacturing provide useful results there is still a need for efficient cleaning of such workpieces while damaging or affecting of the workpiece during cleaning shall be minimized. A solution desirably should be usable for a variety of different additive manufacturing processes that operate based on different chemical materials for building up the workpiece.

EP 2 216 105 B1 (Peugeot) describes a method for cleaning and drying a machined part by setting into motion by centrifugation of the machined part in which the centrifugation comprises the rotation of the machined part about at least two rotation axes inclined with respect to each other.

DE 10 2015 120 211 A1 (Zippel) relates to a movable holding device for workpieces or machine components to be cleaned industrially, comprising at least one first drive unit with a horizontally extending first drive shaft which is drivable about a pivot axis by means of the first drive unit, a second arranged on the first drive shaft unit with a second drive shaft, which is drivable by means of the second drive unit about a first, perpendicular to the pivot axis extending axis of rotation and a workpiece carrier unit with a workpiece carrier for holding receiving the workpieces or machine components to be cleaned.

SUMMARY OF THE INVENTION

The invention relates to a device for spinning a workpiece. Such a workpiece is preferably of a type that is made by additive manufacturing (also further referred to as "3D printed workpiece" herein, wherein the manufacturing by stereolithography or digital light processing is sometimes preferred). The device comprises a rotor for spinning about a spinning axis. Further, the device may comprise a receptacle for holding the workpiece. The receptacle is pivotally connected to the rotor for swiveling about a swivel axis that is transverse (or perpendicular) to the spinning axis such that swiveling of the receptacle is enabled between a first angular orientation relative to the spinning axis and a different second angular orientation relative to the spinning axis. The device further comprises a balancing weight that is movably arranged relative to the receptacle. The balancing weight is lockable at different distances relative to the receptacle.

In an embodiment the device comprises the workpiece and the receptacle is optional. The workpiece may be pivotally connected to the rotor for swiveling about a swivel axis that is transverse (or perpendicular) to the spinning axis such that swiveling of the workpiece is enabled between a first angular orientation relative to the spinning axis and a different second angular orientation relative to the spinning axis. The device further comprises a balancing weight that is movably arranged relative to the workpiece. The balancing weight is lockable at different distances relative to the workpiece.

The weight of the balancing weight is typically in the range of 20 g to_100 g or 30 g to 50 g.

The distance at which the balancing weight can be locked is in a range of 30 mm to 150 mm relative to the workpiece.

The invention is advantageous in that it enables spinning of a workpiece at at least two different determined angular orientations. In contrast to a conventional centrifuge in which the angular orientation results from the geometry of the centrifuge and the rotation speed the device of the invention allows for controlling at least one of two or several different angular orientations independent from the rotation speed. Further the invention is advantageous in that it enables effective spinning of a workpiece in accordance to the shape of the workpiece. For example the angular orientations at which a workpiece is spun can be determined already at the stage of design of the workpiece. The invention is further advantageous in that it allows rebalancing the workpiece during spinning, for example as superfluous light hardenable material detaches from the workpiece so that the weight of the workpiece including the superfluous light hardenable material reduces. The invention is further advantageous in that it enables the removal of superfluous material from the workpiece without any use of solvents. Thus, the quality of the workpiece is not affected by any solvents.

The viscosity of the light hardenable material to be removed from the surface of the workpiece during the spinning process is typically in the range of 0.1 to 150 Pa*s or 1 to 100 Pa*s at 23° C. and a shear rate of 1 $s^{-1}$.

The rotation speed is typically in a range of 100 to 3,000 rounds per min (r/min) or in a range of 1,800 to 3,000 r/min. For higher viscosities of the light hardenable material, the latter range is sometimes preferred.

In one embodiment the device comprises the workpiece (for example received on the receptacle). The workpiece may particularly comprise a dental workpiece. Such a dental workpiece may by a dental dentition model, in particular a 3D printed positive model or replica of a patient's dentition. The 3D printed positive model of the patient's dentition may be used as alternative to a plaster model obtained from a dental impression. Further, the workpiece may be a dental aligner. Such a dental aligner comprises the negative shapes of a patient's teeth and may be shaped for moving the teeth toward a desired position.

In one embodiment the workpiece comprises a dental restoration or a plurality of dental restorations, for example one or a plurality of dental crowns, one or a plurality of dental bridges, one or a plurality of dental inlays or a combination of any of those. A dental crown or bridge typically has an outer surface and an inner surface. The outer surface typically corresponds to the surface that is visible or accessible in a patient's mouth (for example the occlusal surface and the side faces), whereas the inner surface typically forms a cavity for being received on a tooth stump or dental abutment.

The workpiece typically has a dimension of 1 to 10 cm in x and y direction and 1 to 5 cm in z direction. The weight of the workpiece is typically in the range of 0.1 g to 100 g or 0.2 g to 50 g.

The workpiece may further comprise one or more support structures for supporting the dental restoration(s) while it(/they) is(/are) built up. The workpiece may also comprise a base structure by which the dental restoration(s) is(/are) retained (eventually via the support structure(s)) on the receptacle.

In one embodiment the device may have only one receptacle and/or only one workpiece. Therefore rebalancing of the workpiece during spinning (for example due to changes in weight) is facilitated.

In one embodiment the device comprises an actuating drive for positioning the balancing weight at the different distances relative to the receptacle by computer control. The actuating drive may comprise a motor and a spindle that is drivable by the motor. The spindle may have a thread that engages a corresponding thread in the balancing weight. The motor may comprise a positioning sensor for controlling an angular position of the motor toward a desired position. Thus, by rotating the motor toward a known angular position the balancing weight is displaced to a known linear position. This is because a rotation of the spindle via the motor is translated in a corresponding proportional linear displacement of the balancing weight. It is noted that the actuating drive is not limited to a spindle drive. The skilled person will recognize alternative actuating drive based on, for example, an electric linear drive or a pneumatic or hydraulic cylinder.

In one embodiment the device further comprises a sensor for sensing an imbalance occurring in response of spinning the rotor. The sensor may be based on an acceleration sensor. The acceleration sensor may be arranged for measuring an acceleration in at least one or two dimensions radial of the spinning axis. For example, the sensor may be mechanically coupled, for example fixed at, the device or a component of the device. In case any imbalance occurs in response of spinning the rotor the device (or a component of it) may vibrate. The vibration of the device can be sensed by the acceleration sensor.

Further, the sensor may be based on a force sensor. The force sensor may be arranged for measuring a force exerted by the rotor on the force sensor in at least one or two dimensions radial of the spinning axis. For example the force sensor may be arranged for sensing a force exerted on a bearing that bears the rotor.

In one embodiment the sensor may be configured for sensing any imbalance occurring in response of spinning the rotor in two or three axes that are based on a Cartesian coordinate system.

In one embodiment the actuating drive is controlled for positioning the balancing weight based on an output of the sensor. For example upon sensing an imbalance (by sensing an acceleration or force) the actuating drive may be controlled to displace the balancing weight in a first direction. During and/or after displacement of the balancing weight any imbalance is preferably sensed again or continued to be sensed. In case the imbalance has increased the actuating drive may be controlled to displace the balancing weight in an opposite second direction. The actuating drive may be controlled to displace the balancing weight in the first and second direction until the imbalance sensed by the sensor reaches a minimum. Therefore the device is configured to rebalance during spinning in response to superfluous material being removed from the workpiece.

In one embodiment the device comprises a swivel arm that is pivotally connected to the rotor for swiveling about the swivel axis. The receptacle thus is preferably pivotally connected to the rotor via the swivel arm. The swivel arm may be of an elongated shape extending along a longitudinal axis. The longitudinal axis is preferably arranged perpendicular to the swivel axis. The swivel arm preferably has a first end and a second end, with the receptacle being arranged at the first end.

The swivel arm preferably has an axis of inertia extending in a dimension through the first and second end. The longitudinal axis may correspond to the axis of inertia of the swivel arm.

In one embodiment the actuating drive is controlled for positioning the balancing weight based on information of a computer on which a data representation (or computer model) of the workpiece is stored. Based on the computer model of the workpiece an axis of inertia of the workpiece and/or a center of mass of the workpiece may be calculated. Based on the axis of inertia of the workpiece, the workpiece may be arranged or built up at a position on the receptacle such that the axis of inertia of the workpiece is in line with the longitudinal axis of the swivel arm. Further the center of mass of the workpiece may be used for adjusting the balancing weight such that an imbalance during spinning of the workpiece about the spinning axis is minimized in the second angular orientation. Therefore the device may be configured such that the axis of inertia of the workpiece and/or the center of mass of the workpiece can be received by the device (in particular by the control unit of the device) in the form of data from a computer.

In one embodiment the device is configured for locking the receptacle in at least the first angular orientation against swiveling. In particular the receptacle may be locked against swiveling by locking the swivel arm against swiveling. Therefore the device may be configured for selectively locking or unlocking the receptacle (or swivel arm) in at least the first angular orientation. When locked, the receptacle (or swivel arm) is preferably locked against swiveling about the swivel axis, whereas when unlocked the receptacle (or swivel arm) is enabled to swivel toward the second angular orientation. Therefore the device may have a locking mechanism which can releaseably lock the rotor and the swivel arm with each other in the first angular orientation. The locking mechanism may comprise a displaceable pin that can be pushed through a first hole in the rotor and a second hole in the swivel arm for locking rotor and the swivel arm with each other. For releasing the pin may be retracted from at least one or both of the first and second hole. The pin may be displaceable by an electrically controllable actuator, for example a solenoid actuator.

In an embodiment the device has a control unit for controlling an operation of the device.

The control unit may electrically control the actuator for locking the rotor and the swivel arm with each other in the first angular orientation or releasing the rotor and the swivel arm from each other for swiveling relative to each other. Accordingly, the device may be generally configured for operating in a first operation mode, in which the receptacle is in the first angular orientation, and in a second operation mode, in which the receptacle is in the second angular orientation. In both, the first and second operation mode, the workpiece is spun about the spinning axis A. However, the angular orientation of the receptacle (and thus of the workpiece) is different in the first and second operation mode. Preferably the first and second angular orientation of the receptacle (and thus of the workpiece) relative to the spinning axis differs by 90 degrees (or essentially 90 degrees) between the first and second operation mode.

In one embodiment in the second angular orientation the swivel arm is oriented such that the axis of inertia of the swivel arm (or the longitudinal axis of the swivel arm) is arranged inclined relative to the spinning axis at an inclination angle. The inclination angle may be 90 degrees (or essentially 90 degrees). Thus, in the first angular orientation the spinning axis and the longitudinal axis are preferably congruent with each other. In other words, in the first angular orientation the swivel arm is oriented such that the axis of inertia of the swivel arm is arranged in line with the spinning axis. In the second angular orientation the spinning axis and the longitudinal axis are preferably inclined by 90 degrees (or essentially 90 degrees) relative each other (with preferably the spinning axis and the longitudinal axis intersecting).

The first end and the second end of the swivel arm are preferably arranged along or on the longitudinal axis. The swivel axis is preferably arranged at a distance from the second end. The swivel axis may further intersect the longitudinal axis. The receptacle preferably has a receiving surface for receiving the workpiece. The swivel axis is preferably arranged between the second end and the receiving surface of the receptacle. The receiving surface may be planar. The receiving surface may further be arranged perpendicular to the longitudinal axis. The receiving surface may be suitable for building up the workpiece thereon. Preferably the receptacle has an axis of inertia that is congruent with the longitudinal axis of the swivel arm, in a situation in which the receptacle is mounted to the swivel arm. Thus the swivel arm including the receptacle mounted thereon preferably can be rotated about the longitudinal axis without an imbalance being caused by the rotation.

In one embodiment the receptacle is separably mountable or mounted to the swivel arm. Further, the receptacle may be separably mountable into an additive manufacturing device for layerwise building up workpieces from a light hardenable material. Thus, the receptacle may be selectively mountable in the additive manufacturing device or the spinning device.

The balancing weight is preferably linearly guided within the swivel arm. Preferably the balancing weight is linearly guided along the longitudinal axis of the swivel arm. The balancing weight may be displaceably mounted at the swivel arm for a linear displacement in a dimension through the first and the second end (or along the longitudinal axis).

In one embodiment the workpiece has an axis of inertia and the workpiece is mounted to the receptacle such that the axis of inertia of the workpiece is in line with the axis of inertia of the swivel arm. The workpiece may thus be mounted to the receptacle such that the axis of inertia of the workpiece is in line with the longitudinal axis of the swivel arm.

In one embodiment the balancing weight and the workpiece are arranged on opposite sides of the swivel axis. Thus, the balancing weight is arranged for compensating a weight of the workpiece that otherwise would cause a torque about the swivel axis. Further, in the second angular rotation the balancing weight and the workpiece are preferably additionally arranged on opposite sides of the spinning axis. Thus, the balancing weight is arranged for compensating a centrifugal force caused by the workpiece during spinning about the spinning axis. Such a centrifugal force, if not compensated, would otherwise cause an imbalance during spinning the workpiece about the spinning axis.

In one embodiment the device further comprises a vacuum chamber. The vacuum chamber may be formed by a collecting vessel and a closure for openably closing (or sealing) the collecting vessel. The workpiece may be arranged within the collecting vessel for spinning.

In one embodiment the device comprises a spinning drive for driving the rotor. The spinning drive preferably is configured to operate at a variable rotation speed. In particular, the spinning drive can be preferably operated at a particular rotation speed selected from a range of rotation speeds, by control of the control unit.

In one embodiment the rotor extends through the closure of the vacuum chamber. Accordingly a seal may be arranged within the closure for slidably sealing with a surface of the rotor. In this embodiment the spinning drive is arranged outside the vacuum chamber.

In an alternative embodiment the rotor and the spinning drive are arranged within the vacuum chamber. Accordingly a sliding seal may not be necessary.

The device described in the present text is in particular useful for cleaning a workpiece which has been produced or obtained by an additive-manufacturing process comprising the light curing of a light hardenable material layer by layer (e.g. using a stereolithography process).

Thus, described is also a process for cleaning such a workpiece, wherein the process comprises the steps of providing a device as described in the present text,
placing or fixing a workpiece, in particular a dental workpiece having light curable material located on its surface, to a receptable which is pivotally attached relative to the rotor,
spinning the workpiece at a rotation speed resulting in the removal of the light curable material from the surface of the workpiece.

DETAILED DESCRIPTION OF THE INVENTION

Figure 1:
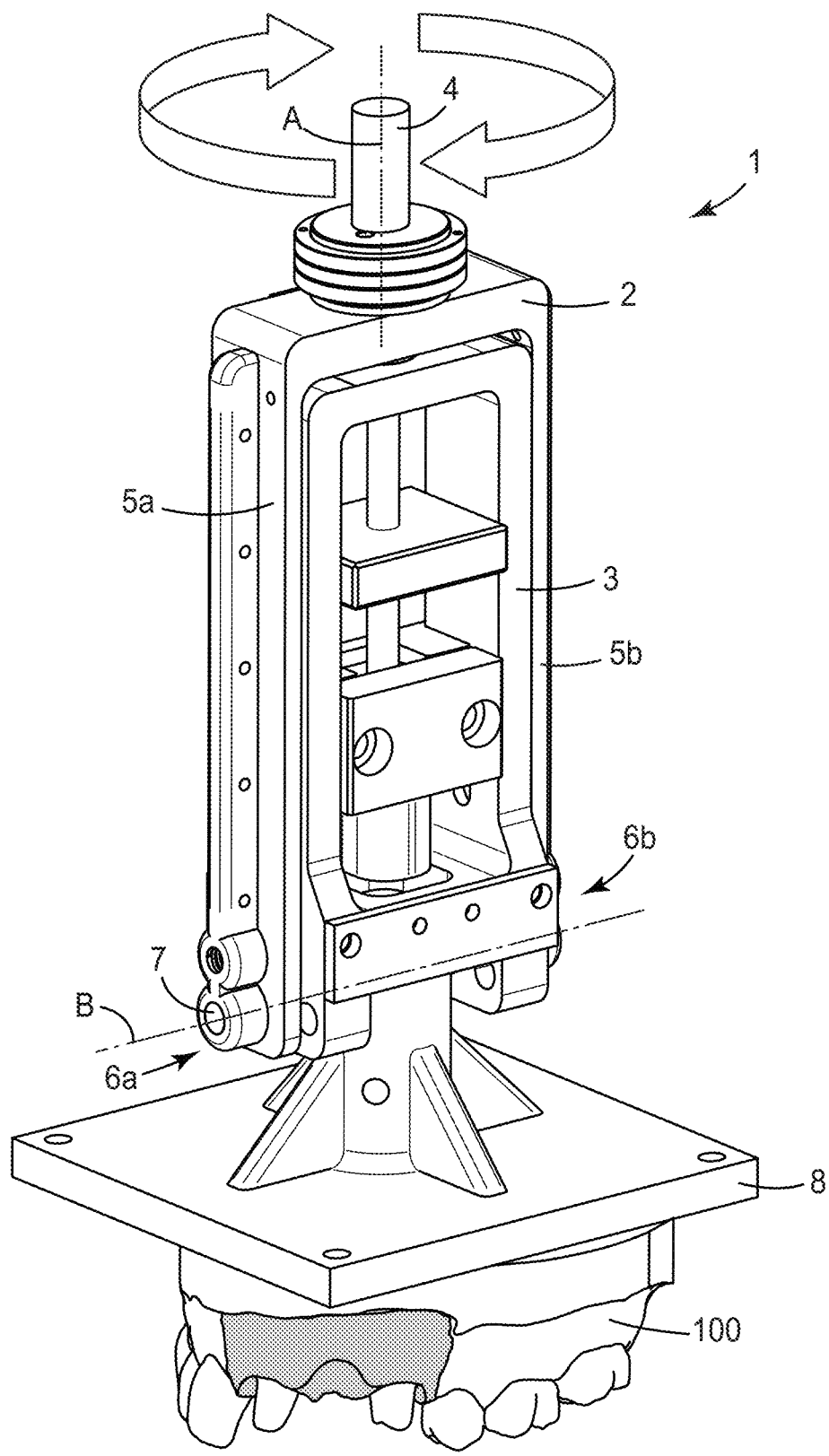
FIG. 1 is a perspective view of a device for spinning a workpiece in a first angular orientation according to an embodiment of the invention.

FIG. 1 shows a device 1 for spinning a workpiece 100. In particular the workpiece 100 is 3D printed, in particular built up from multiple layers of a light hardened material. During a process of building up the workpiece, light hardenable (not yet hardened) material is used to form individual layers of a particular thickness that are subsequently each hardened before a next layer of light hardenable material is added on the hardened layer. For hardening each layer of light hardenable material is exposed to light (for example UV light) which causes the respective layer to harden. After the workpiece 100 is built up, light hardenable (not yet hardened) material may still adhere to the workpiece 100. Such adhering light hardenable (not yet hardened) material—also further referred to "superfluous material" herein—may be removed at least partially by spinning it off by means of centrifugal forces.

In the example the workpiece 100 is a positive dental model replicating a dentition of a patient. Such a dental model may be used by a dental lab as an alternative of a plaster model. In another example the dental workpiece may be a dental restoration. The dental restoration may be a dental crown or bridge, or a partial dental crown, a dental inlay or one or more replacement tooth/teeth. Further, dental workpiece may comprise a plurality of dental restorations. The plurality of dental restorations may be printed as one piece (for example in an array or tree) and may be separable from each other after.

The device 1 has a rotor 2. The rotor 2 is rotatable about a spinning axis A. A swivel arm 3 is rotatably (or pivotally) suspended relative to the rotor 2. The swivel arm 3 is rotatably (or pivotally) suspended relative to the rotor 2 about a swivel axis B. In the example the swivel axis B is arranged transverse, in particular perpendicular, to the spinning axis A. Therefore the swivel arm 3 is rotatable about the spinning axis A as well as perpendicular to the spinning axis A. The rotor 2 in the example is fork-shaped. The rotor 2 in particular has a drive shaft 4 from which two legs 5a and 5b protrude. The drive shaft 4 extends along the spinning axis A and the two legs 5a, 5b each extend parallel to and laterally offset from the spinning axis A. Each of the legs 5a, 5b has a free end portion 6a, 6b, respectively. The swivel arm 3 is suspended at the rotor 2 by an axle 7. The axle 7 extends through the free end portions 6a, 6b of the rotor 2 and through the swivel arm 3, and thus forms a rotatable link between the rotor 2 and the swivel arm 3. The rotatable link further defines the swivel axis B. Alternatively, each of two axles may extend through one free end portion 6a/6b into one side of the swivel arm 3, and thus may form the rotatable link between the rotor 2 and the swivel arm 3. The skilled person will recognize further designs of a rotator including a swivel arm suspended to the rotor. The invention therefore is not limited to the design of the example.

The rotor 2 can be driven for spinning about a spinning axis. Therefore the rotor 2, in particular the shaft 4 may be coupled to a spinning drive (not illustrated). The spinning drive can be preferably controlled at various rotation speeds, for example within a range of up to 3000 rounds per minute. The spinning drive in the example is a servomotor.

The device 1 further has a receptacle 8 for holding the workpiece 100. The receptacle 8 in the example is provided in the shape of a flat platform on which the workpiece 100 can be fixed. However, other shapes providing an appropriate interface for attaching the workpiece are possible. The receptacle 8 is pivotally attached relative to the rotor 2 (in this example via the swivel arm 3) for swiveling about the swivel axis B. Accordingly, the receptacle 8 may be swiveled about the swivel axis B independent from any spinning about the spinning axis A. The swiveling of the swivel arm 3 (and thus of the receptacle 8) relative to the rotor 2 is enabled between a first angular orientation relative to the spinning axis A and a different second angular orientation relative to the spinning axis A. The swiveling of the swivel arm 3 (and thus of the receptacle 8) relative to the rotor 2 may be restricted otherwise, for example disabled outside an angular range defined between the first and the second angular orientation. The first angular orientation is shown in FIG. 1 and is defined herein as orientation of 0 (zero) degrees relative to the spinning axis A. At the first angular orientation the spinning axis A is preferably congruent with an axis of inertia of the workpiece 100. Hence the angle between the axis of inertia of the workpiece 100 and the spinning axis is 0 degrees. Therefore at the first angular orientation the workpiece 100 can be spun about the spinning axis A without the workpiece 100 causing an imbalance during spinning. Further, in the example at the first angular orientation the spinning axis A extends through the workpiece 100. This is achieved in that the axis of inertia of the workpiece 100 is determined during the design of the workpiece in a CAD system and by mounting (or 3D printing) the workpiece 100 with the axis of inertia arranged in line with the spinning axis A on the receptacle A. The CAD system may further be used for designing an interface on the workpiece 100 which can be fit with a corresponding counter interface of the receptacle 8 in one unique rotational and lateral position. Such an interface may for example comprise at least two spaced pins that can be received in correspondingly spaced and sized holes provided in the receptacle. Thus the workpiece 100 can be mounted with the axis of inertia arranged in line with the spinning axis A by simply mating the interfaces of the workpiece 100 and the receptacle 8 with each other.

The swivel arm 3 is preferably lockable in the first angular orientation. If locked, the swivel arm 3 is prevented from swiveling away from the first angular orientation. Further, the swivel arm 3 is preferably freely rotatable from the first angular orientation to the second angular orientation if the swivel arm 3 is unlocked. Therefore, the device 1 may be operated in a first operation mode in which the receptacle 8 is in the first angular orientation and in which the device 1, and thus the workpiece 100, is spun about the spinning axis A. This preferably causes superfluous material adhering to the workpiece 100 (in particular superfluous non-hardened light hardenable material used for 3D printing of the workpiece 100) to separate from the workpiece 100 by centrifugal forces. In the first operation mode the swivel arm 3 is preferably locked against swiveling toward the second angular orientation. This is to prevent the receptacle 8 from automatically swiveling toward the second angular orientation by centrifugal forces. It is noted that although the workpiece may be initially spun about the axis of inertia, the swivel arm 3 with the receptacle 8 typically tends to deflect toward the second angular orientation in practice so that the locking in the first angular orientation is useful.

Figure 2:
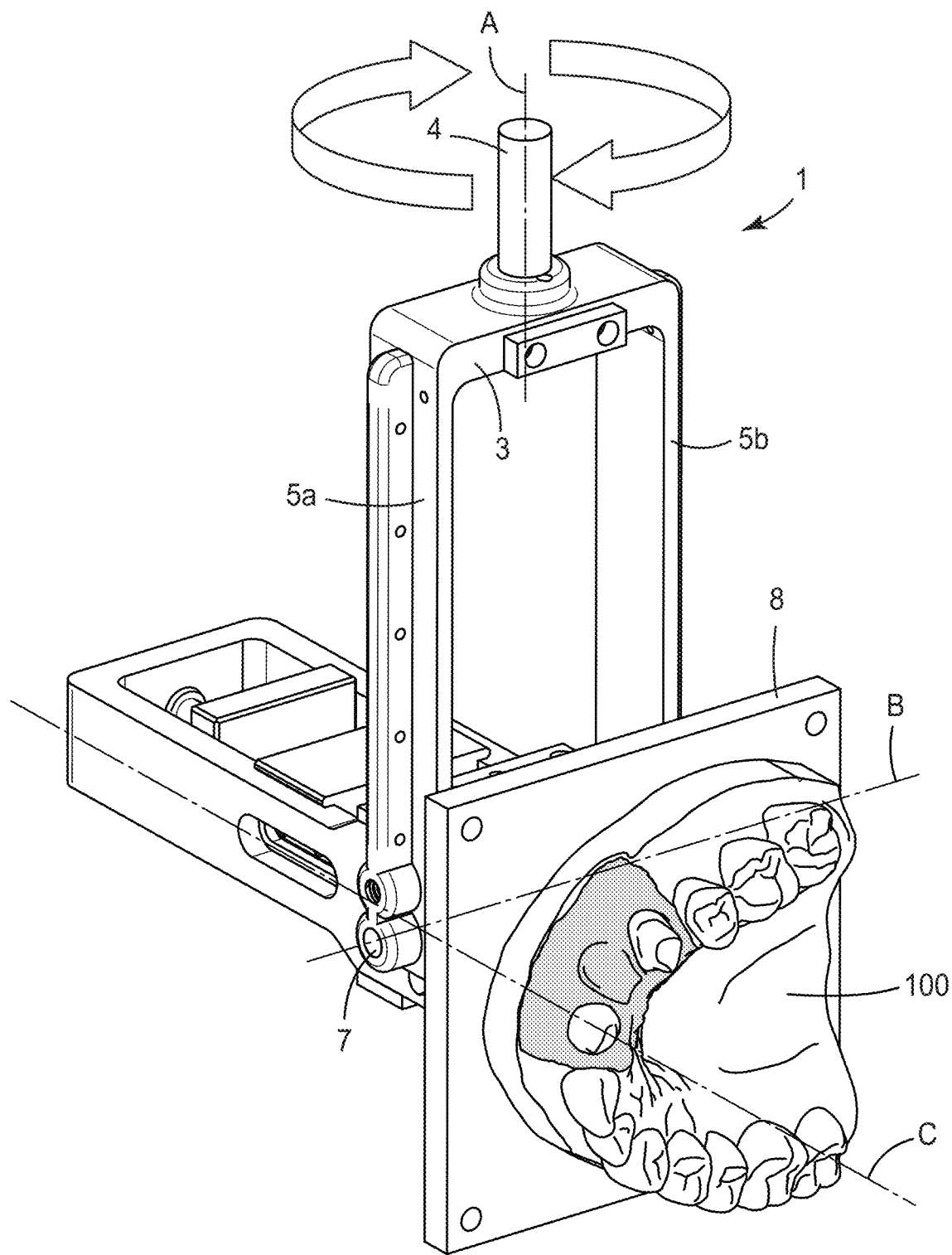
FIG. 2 is a perspective view of the device shown in FIG. 1 in a second angular orientation according to an embodiment of the invention.

The device 1 may be further operated in a second operation mode in which the receptacle 8 is in the second angular orientation and in which the workpiece 100 is spun about the spinning axis A. Hence, although the workpiece is still spun about the same spinning axis A the workpiece is oriented differently so that in the first and second angular orientation different portions of superfluous material can be removed from the workpiece. The second angular orientation is shown in FIG. 2. The second angular orientation is defined herein as orientation of essentially 90 degrees (or 90 degrees) relative to the spinning axis A. Although the second angular orientation is desirably 90 degrees the swivel arm 3 typically assumes an angular orientation resulting from the centrifugal forces and eventually forces of gravity acting on the workpiece. Thus slight deviations from 90 degrees shall be encompassed by the term "essentially 90 degrees". In the second angular orientation the one side of the workpiece 100 (in the example the occlusal side of the model of the dentition) faces in a direction radially away from the spinning axis A. Accordingly any superfluous material adhering at this side is urged away from the workpiece 100 due to centrifugal forces acting on the superfluous material during spinning about the spinning axis A. In the first angular orientation the same side of the workpiece 100 (in the example the occlusal side of the model of the dentition) faces in a direction along or axially to the spinning axis A. Therefore in the first angular orientation any superfluous material adhering at surfaces of the workpiece 100 that face in a direction radially away from the spinning axis A are urged away from the workpiece 100 due to centrifugal forces, whereas superfluous material adhering at surfaces of the workpiece 100 that face in a direction radially toward the spinning axis is urged toward the workpiece 100. Therefore while in the first angular orientation not all of the surfaces of the workpiece 100 may be cleaned from superfluous material, additional surfaces of the workpiece 100 can be cleaned from superfluous material by additionally spinning the workpiece 100 in the second angular orientation.

In particular, in case the workpiece 100 is a dental crown that forms a cavity for being received on a natural tooth or abutment in a patient's mouth. Spinning of the dental crown consecutively in the first and second angular orientation (or vice versa) provides for removing a maximized amount of superfluous material. In this case the dental crown is preferably oriented such that the cavity opens in a direction away from the receptacle 8 and in a dimension (axially) of the spinning axis A in the first angular orientation. Spinning of the dental crown in the first angular orientation will typically cause superfluous material adhering on outer sides of the dental crown to be removed from the dental crown, whereas spinning of the dental crown in the second angular orientation will typically cause superfluous material adhering on inner sides of the dental crown (namely superfluous material adhering within the cavity) to be removed from the dental crown. In the in the second angular orientation the dental crown is preferably oriented such that the cavity opens in a direction away from the receptacle 8 and in a dimension radially of the spinning axis A.

Figure 3:
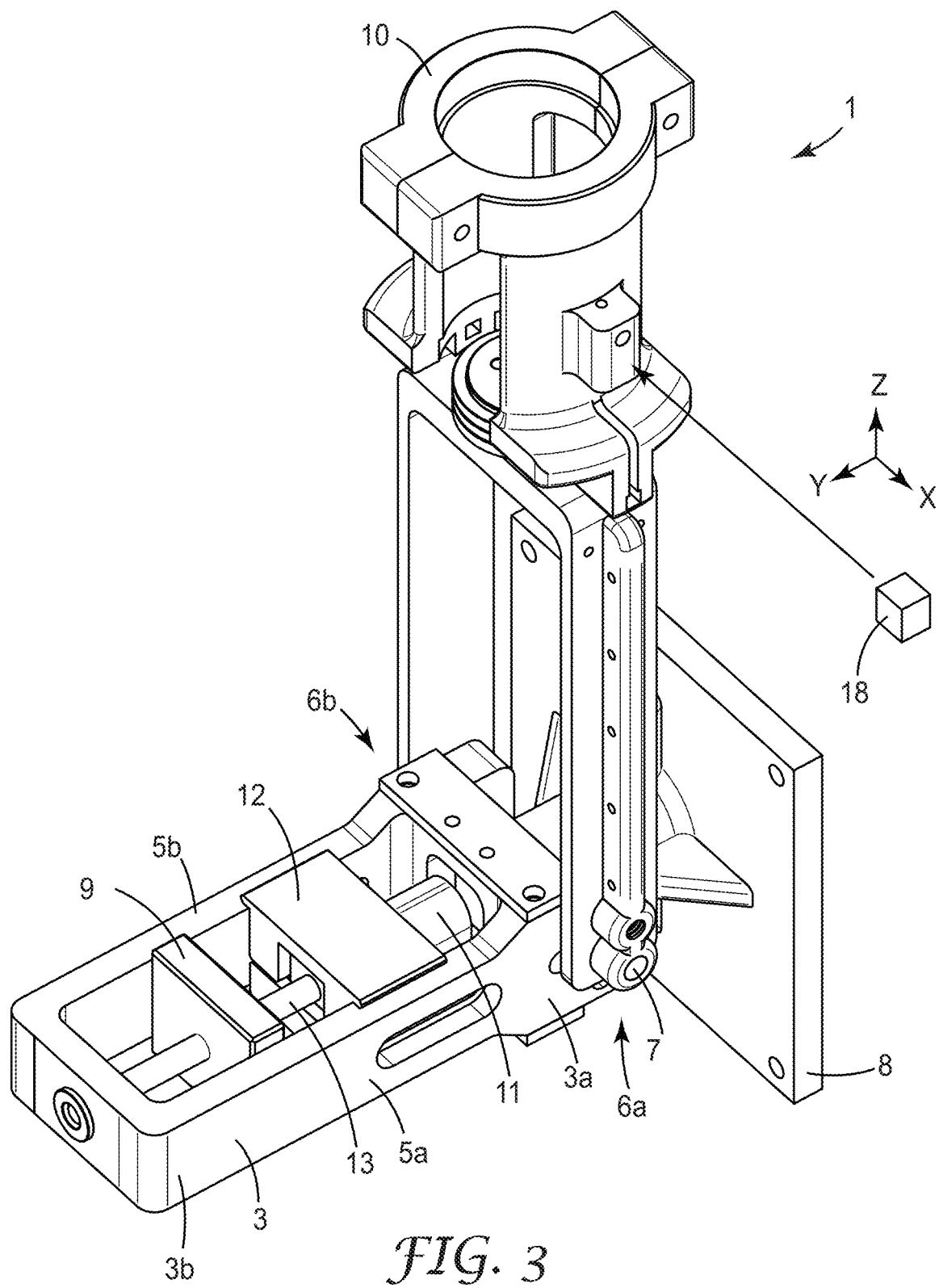
FIG. 3 is a different perspective view of the device shown in FIG. 2.

As shown in FIG. 3 the swivel arm 3 is suspended to the rotor 2 at (or adjacent) a first end 3a of the swivel arm 3. Further, the swivel arm 3 has a second end 3b opposite of the first end 3a. The receptacle 8 is attached at the first end 3a of the swivel arm 3. Further, the workpiece 100 is attached on the receptacle 8. The swivel axis B is arranged between the workpiece 100 and the second end 3b of the swivel arm 3. Further, the workpiece 100 and the second end 3b of the swivel arm are arranged on opposite sides of the swivel axis B. The swivel arm 3 is balanced such that it naturally remains in the second angular orientation when the workpiece 100 is attached to the receptacle 8 at the swivel arm 3 (as shown in the Figure). For balancing the swivel arm 3 including the receptacle 8 relative to the workpiece 100, the swivel arm 3 comprises a balancing weight 9. The balancing weight 9 is movably arranged relative to the receptacle 8. Further, the balancing weight 9 is lockable at different distances relative to the receptacle 8. The swivel arm extends 3 along a longitudinal axis C which is in line with the spinning axis A in the first angular orientation, and which is 90 degrees angularly offset relative to the spinning axis A in the second angular orientation. The longitudinal axis C further corresponds to an axis of inertia of the swivel arm 3 and of the receptacle 8. Therefore in the first angular orientation the swivel arm 3 and the receptacle 8 (without a workpiece) can be spun about the spinning axis without an imbalance occurring. The balancing weight 9 is particularly displaceable along the longitudinal axis C. In the example, the balancing weight 9 is linearly guided within the swivel arm 3 for a movement along the longitudinal axis C. Further, the balancing weight 9 is engaged with a threaded spindle 13 which, if rotated, causes the balancing weight 9 to displace along the longitudinal axis C. Due to the thread connection between the spindle 13 and the balancing weight 9 the balancing weight 9 is locked in place in case the spindle 13 does not rotate. The swivel arm 3 further comprises a motor 11 which can drive the threaded spindle 13 in both directions of rotation. The rotation of the motor 11 further can be controlled in its angular position. For example, the motor 11 may be a stepper motor, or another motor having a position measuring system. Therefore, the linear position of the balancing weight 9 can be adjusted to a desired position (via rotating the spindle 13 for a certain angular rotation) within the swivel arm 3 by control of a computer. Depending on the weight and the position of the center of mass of the workpiece 100 the balancing weight 9 may be adjusted to an appropriate distance relative to the center of mass of the workpiece 100 to minimize any imbalance during spinning of the workpiece 100 within the second angular orientation. For example, the center of mass and eventually the weight of the workpiece may be transmitted to the device 1 (for example from a CAD system) and the device 1 may automatically adjust the balancing weight accordingly.

Alternatively or additionally, the device 1 may comprise a sensor 18 (schematically illustrated only) for sensing an imbalance occurring in response of spinning the rotor 2. In the example the sensor 18 is a three axes acceleration sensor, for example as available under the designation MPU 6050 from TDK Corp., Japan. The sensor 18 is preferably mechanically coupled to the device 1 such that a vibration caused by an imbalance of spinning the rotor is mechanically transmitted to the sensor 18. This can be achieved, for example by mounting the sensor 18 to a mount 10 of the device 1 for attaching the spinning drive (not shown). However, the sensor 18 may be likewise mounted to any other component of the device 1 which is mechanically coupled to the rotor 2. The sensor 18 can be used to measure an acceleration in at least two of the three axes along which the sensor 18 can sense an acceleration. In the Figure the three axes along which the sensor 18 can sense an acceleration are designated as X, Y and Z. In case an acceleration is sensed (particularly along axes X and Y but eventually also along the axis Z) the balancing weight 9 is displaced until the acceleration reaches a minimum. Thereby the balancing weight 9 may be displaced in one direction first, and in case the sensed acceleration increases, the balancing weight 9 may be displaced in the opposite direction until the sensed acceleration reaches a minimum. Therefore the device 1 can be used with differently shaped and configured workpieces and is configured to automatically rebalance during spinning.

The motor 11 in the example is fixed within the swivel arm 3 via a fixing block 12. However, the motor 11 may be likewise fixed by alternative means or directly to a component of the swivel arm 3. The motor 11 in the example is electrically connected to a power source and eventually to data lines via collector rings (not illustrated). Alternatively, the motor 11 may be electrically connected to the power source and eventually to the data lines via an inductive interface.

Figure 4:
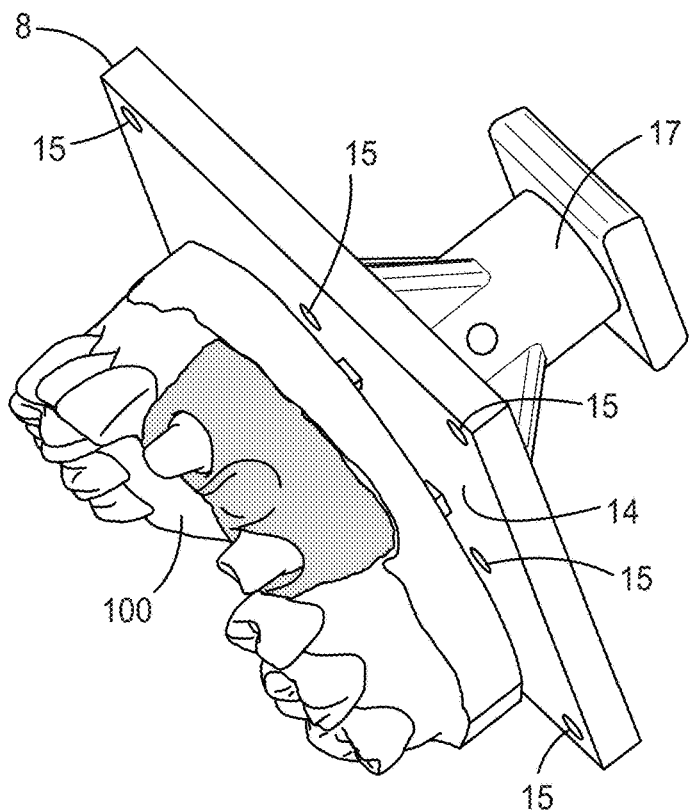
FIG. 4 is a perspective view of a receptacle including a workpiece according to an embodiment of the invention.

FIG. 4 shows the receptacle 8 with the workpiece 100 in more detail. The receptacle 8 has a planar receiving surface 14 and a plurality of positioning holes 15. The positioning holes 15 have a known position relative to the longitudinal axis C measured in the plane of the receiving surface. The position of the positioning holes 15 can be used to design the workpiece such that it can be fixed on the receptacle at a particular desired position. Typically the workpiece is designed such that the center of mass of the workpiece is aligned with the longitudinal axis C when mounted on the receptacle 8 by use of the positioning hole 15. Further, in the example the receptacle 8, can be used as build platform in a 3D printing device. Therefore the receptacle 8 comprises a coupling 17 by which the receptacle 8 is removably attachable to the swivel arm 3. In addition the coupling 17 enables the receptacle 8 to be removably attached within a 3D printing device for directly building up the workpiece 100 on the receptacle.

Figure 5:
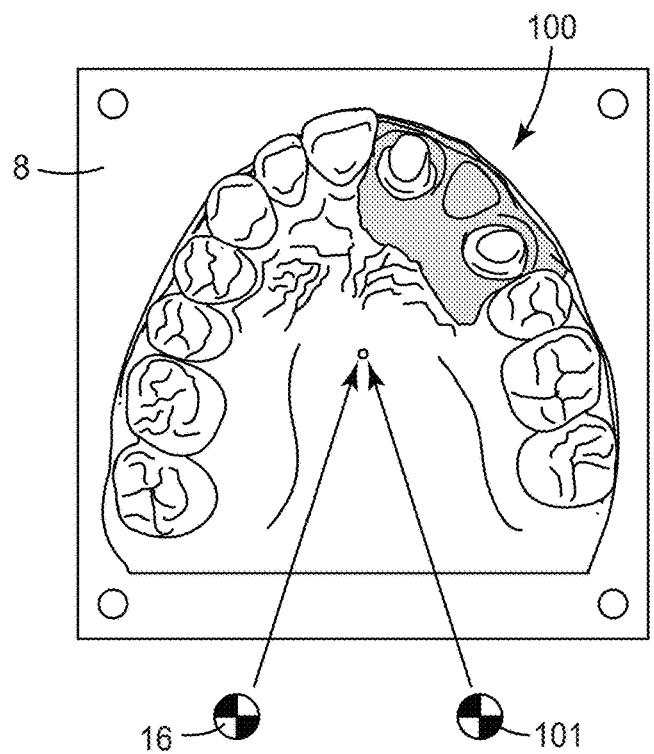
FIG. 5 is a bottom view of the receptacle including the workpiece shown in FIG. 4.

FIG. 5 illustrates the workpiece 100 with the center of mass 16 indicated. In the example the center of mass 16 is positioned on a center of mass 101 of the receptacle 8 in a plane that is perpendicular to the longitudinal axis C. Therefore any imbalance of the combination of the receptacle and the workpiece 100 can be avoided by design of the workpiece in the appropriate positional relationship with the shape of the receptacle 8.

Figure 6:
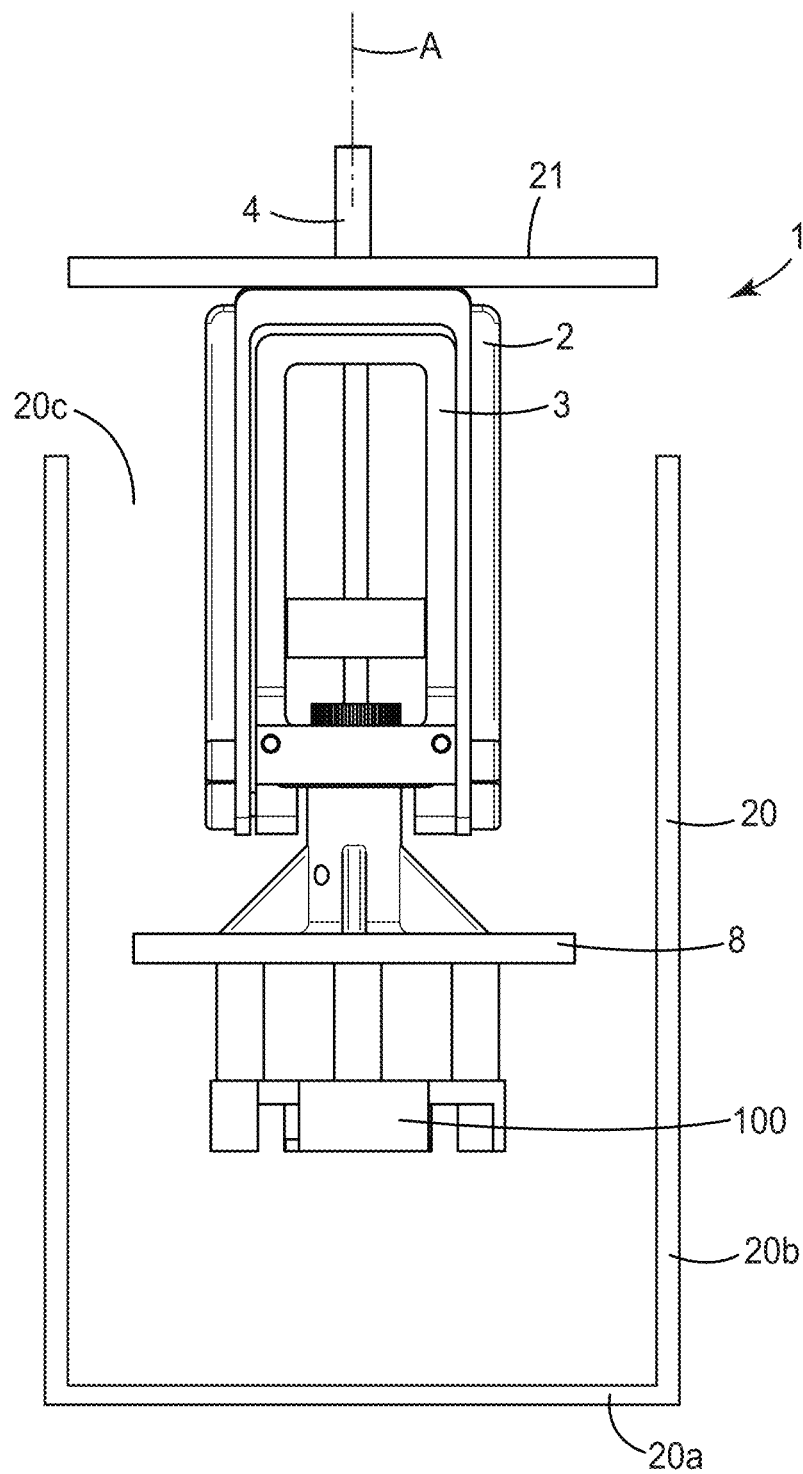
FIGS. 6, 7 are cross-sectional views of the device in combination with a collecting vessel according to an embodiment of the invention.
Figure 7:
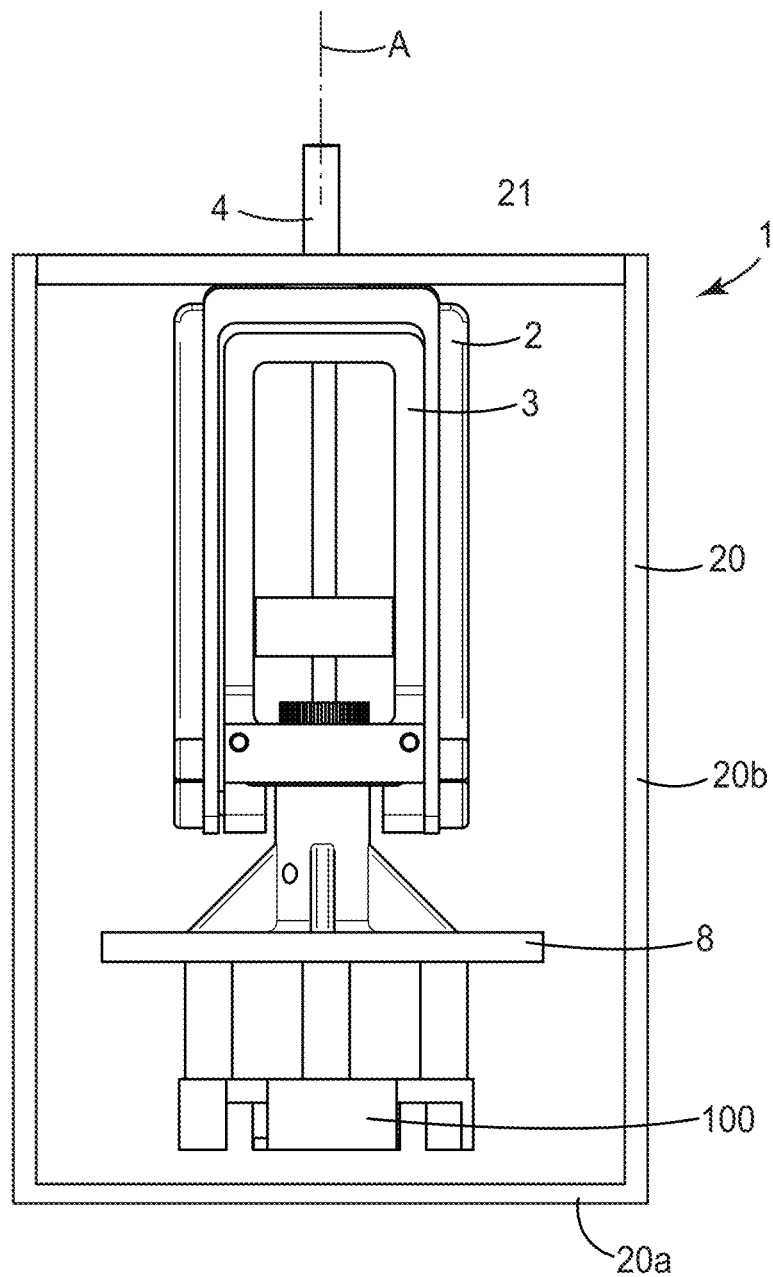

FIG. 6 shows the device 1 which in the example comprises a collecting vessel 20. The rotor 2 including the swivel arm 3, the receptacle 8 and the workpiece 8 are (partially) disposed within the collecting vessel 20. The collecting vessel 20 is cup-shaped and has a bottom wall 20a and a circumferential side wall 20b. The circumferential side wall 20b is arranged around the spinning axis A. Therefore any superfluous material that is centrifuged off from the workpiece 100 is collected by the circumferential side wall 20b and eventually flows toward the bottom wall 20a. The collecting vessel 20 has an opening 20c which can be closed by a closure 21 as shown in FIG. 7. The collecting vessel 20 in combination with the closure 21 may form a vacuum chamber. A vacuum may be generated via a vacuum pump (not illustrated) connected to the vacuum chamber. The vacuum can help avoiding or minimizing any presence of air bubbles on the workpiece. The drive shaft 4 extends through the closure 21 and the spinning drive (not shown in FIGS. 6 and 7) may be arranged entirely outside the collecting vessel 20. At least the circumferential side wall 20b may be light transmissive (preferably transparent). Thus the workpiece 100 thus can be exposed to light emitted through circumferential side wall 20b. This allows any (eventually minor) residual superfluous light hardenable material that still adheres to the workpiece 100 after spinning to harden and to become part of the workpiece. Further, any superfluous light hardenable material collected in the collecting vessel 20 can be hardened. This enables the collecting vessel 20 to be disposed without eventually harmful non-hardened light hardenable material.

Figure 8:
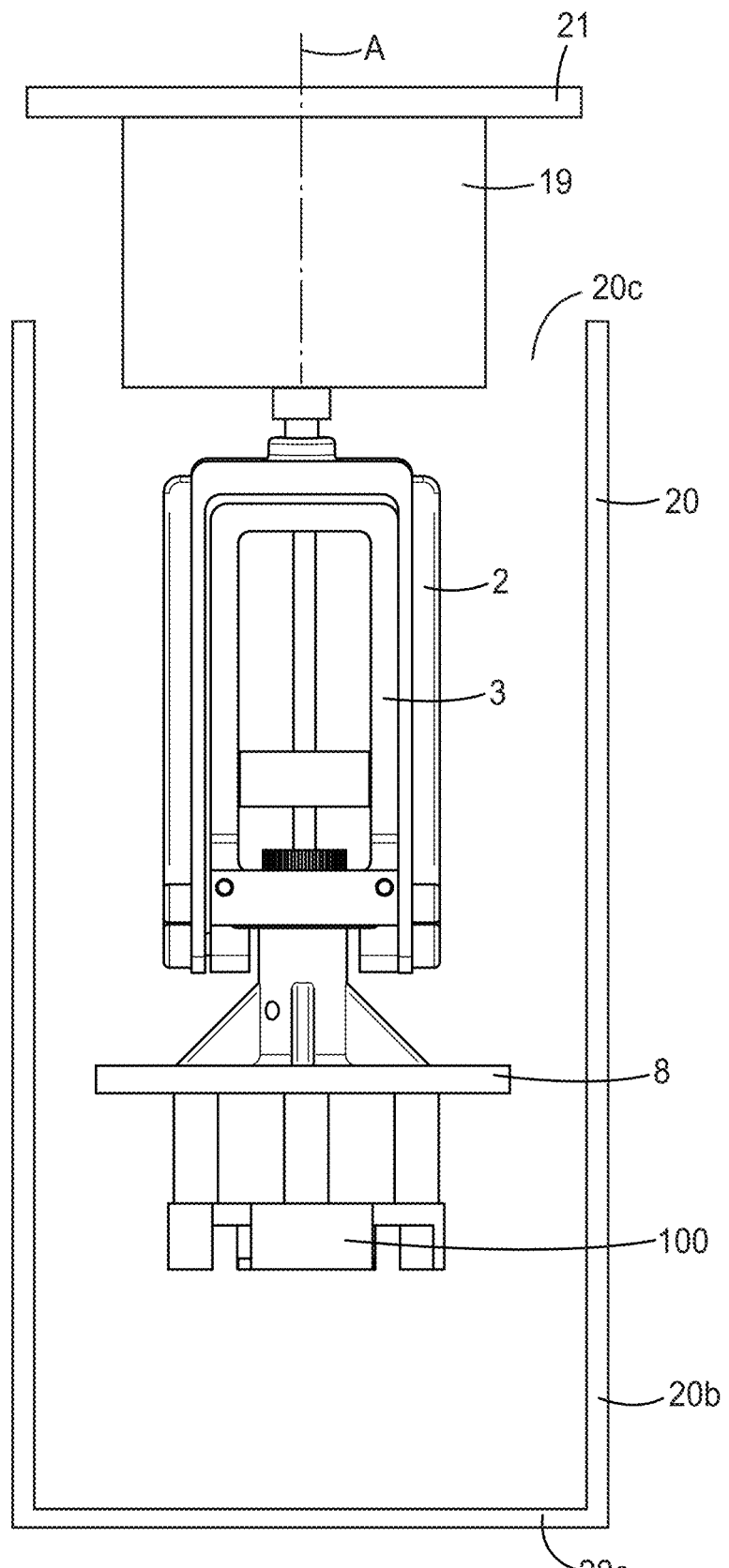
FIGS. 8, 9 are cross-sectional views of the device in combination with an alternative collecting vessel according to an embodiment of the invention.
Figure 9:
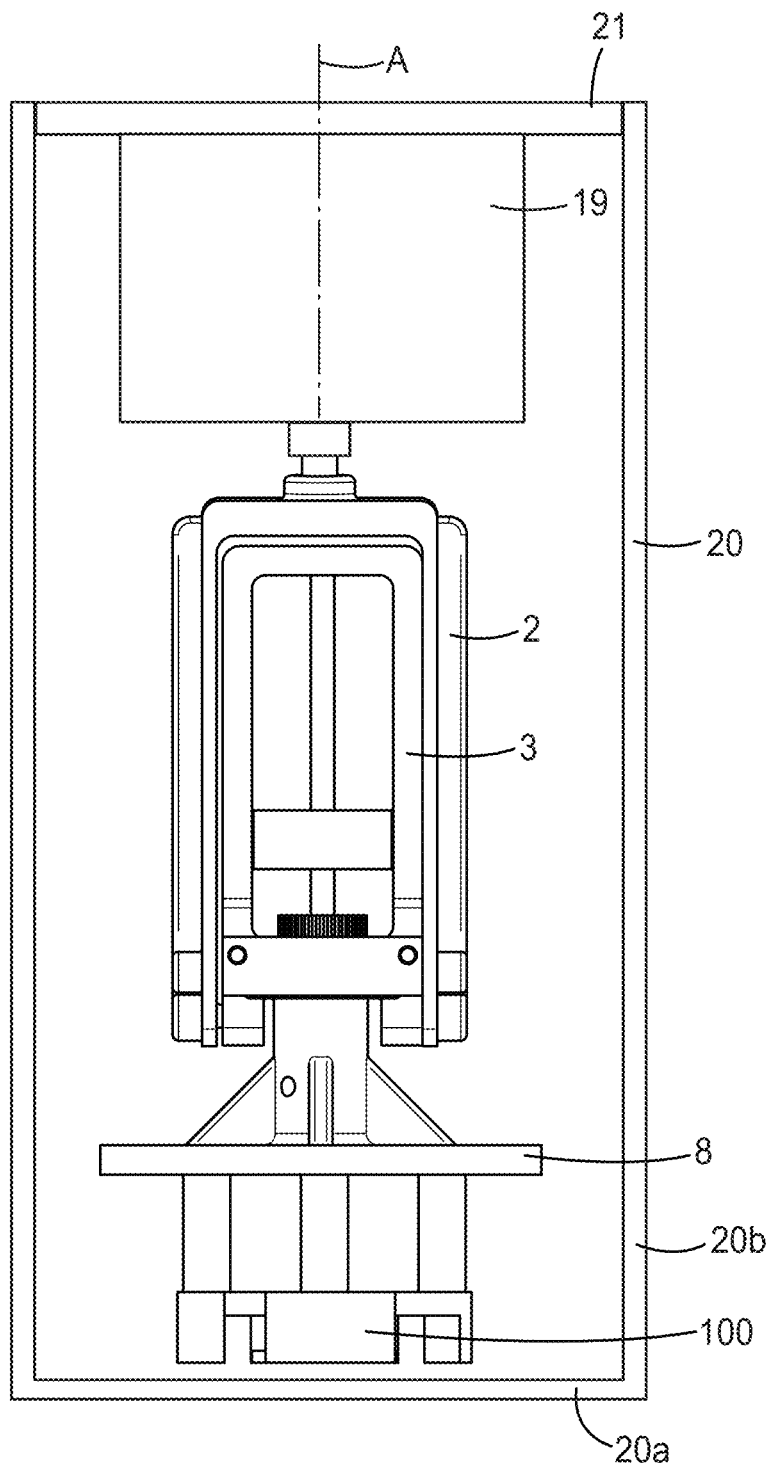

FIGS. 8 and 9 are identical to FIGS. 6 and 7, respectively except for the closure 21 being combined with the spinning drive 19. Again, the rotor 2 including the swivel arm 3, the receptacle 8 and the workpiece 8 are (partially) disposed within the collecting vessel 20. The collecting vessel 20 is cup-shaped and has a bottom wall 20a and a circumferential side wall 20b. The circumferential side wall 20b is arranged around the spinning axis A. The collecting vessel 20 has an opening 20c which can be closed by the closure 21 as shown in FIG. 9. In the example the spinning drive 19 is arranged inside the collecting vessel 20. Thus a passage for the drive shaft 4 through the closure 21 is not necessary. Again at least the circumferential side wall 20b may be light transmissive (preferably transparent), as described above.

Figure 10:
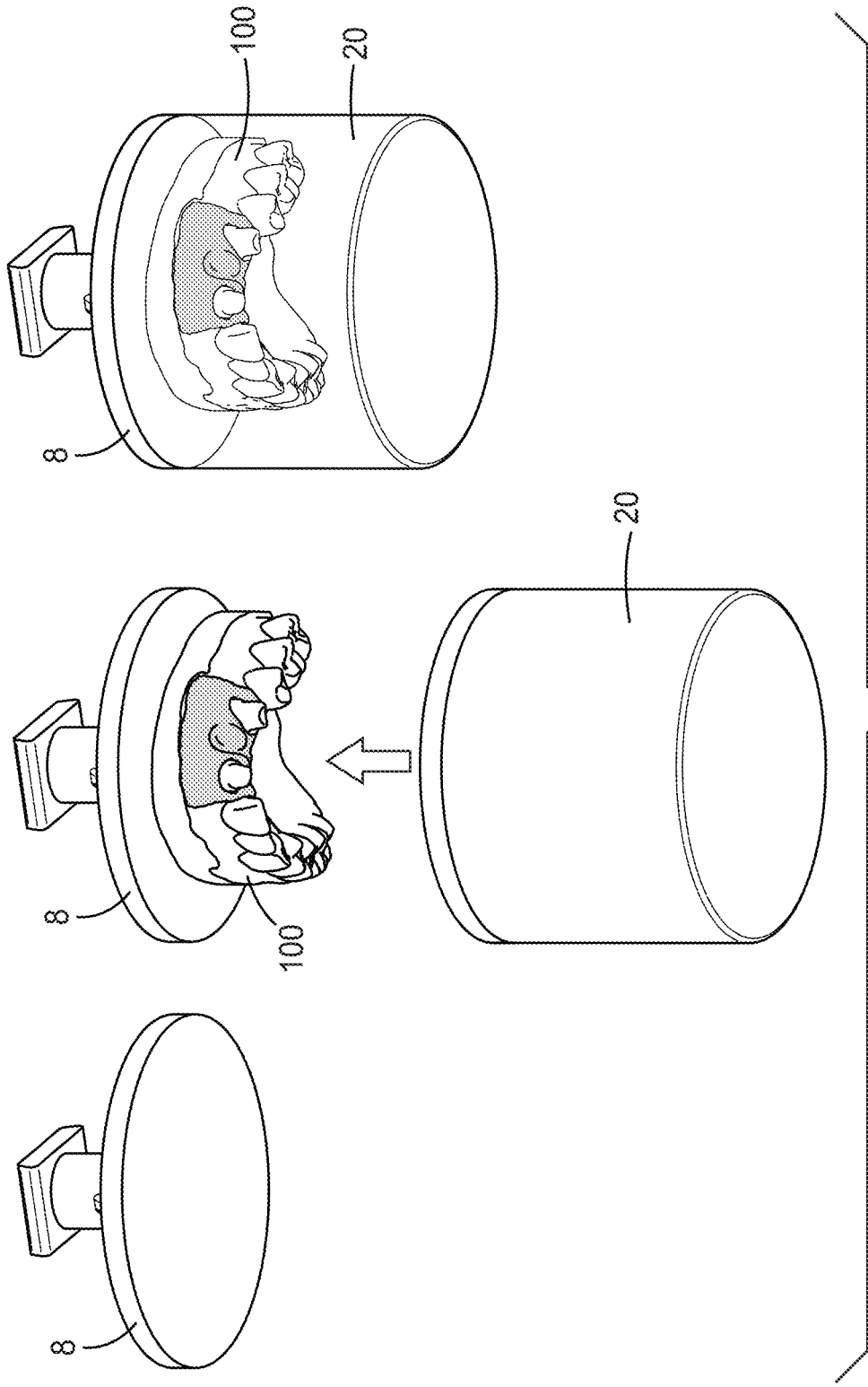
FIG. 10 illustrates perspective views of a receptacle in combination with a further collecting vessel according to an embodiment of the invention.

FIG. 10 shows an alternative collecting vessel 20 that is directly arranged on the receptacle 8 and enclosing the workpiece 100 therein. The collecting vessel 20 again is cup-shaped. In the example the receptacle 8 (in this case preferably in the form of a build platform on which the workpiece is directly built up) forms a closure of the collecting vessel 20. The collecting vessel 20 in this example may be mounted to the receptacle by means of thread connection, a bayonet joint, a flap mechanism, a magnetic fixture or the like.

The collecting vessel 20 in the examples of FIGS. 6-10 may be inwardly provided which an absorbing layer, for example a fabric or fleece that are capable of absorbing and retaining a liquid. Thus any light hardenable material separating from the workpiece and impinging on the absorbing layer is absorbed and retained. Thus splashes returning to the workpiece 100 can be minimized and cleaning of the workpiece 100 can be maximized. The absorbing layer is preferably light transmissive. For example a fabric or fleece preferably has openings through which light can pass and may be formed of transparent or translucent fibers that permit additional light to pass through. Therefore the workpiece 100 can be exposed to light to harden any residual light hardenable material on the workpiece 100. At the same time light hardenable material retained in the absorbing layer is hardened. The collecting vessel 20 including the absorbing layer or—if separable—only the absorbing layer may be disposed after hardening any residual light hardenable material on the workpiece 100. Whether the absorbing layer with the retained light hardened material is separable from the collecting vessel can be controlled by the person skilled in the art by selecting a material for the collecting vessel 20 that does not bond to the light hardened material.

What is claimed is:

1. A device for spinning a workpiece, comprising a rotor for spinning about a spinning axis and a receptacle for holding the workpiece, the receptacle being pivotally connected to the rotor for swiveling about a swivel axis that is transverse to the spinning axis, such that swiveling of the receptacle is enabled between a first angular orientation relative to the spinning axis and a different second angular orientation relative to the spinning axis, wherein the device comprises a balancing weight that is movably arranged relative to the receptacle and being lockable at different distances relative to the receptacle, a sensor for sensing an imbalance occurring in response of spinning the rotor, and an actuating drive for positioning the balancing weight at the different distances relative to the receptacle wherein the actuating drive comprises a motor and a spindle drivable by the motor, wherein a rotation of spindle via the motor is translated in a corresponding proportional linear displacement of the balancing weight.

2. The device of claim 1, being configured for locking the receptacle in at least the first angular orientation against swiveling.

3. The device of claim 1, wherein the actuating drive for positions the balancing weight at the different distances relative to the receptacle by computer control.

4. The device of claim 3, further comprising a sensor for sensing an imbalance occurring in response of spinning the rotor.

5. The device of claim 4, wherein the sensor is based on an acceleration sensor that is arranged for measuring an acceleration in a dimension radial of the spinning axis, or based on a force sensor that is arranged for measuring a force exerted by the rotor on the force sensor in a dimension radial of the spinning axis.

6. The device of claim 4, wherein the actuating drive is controlled for positioning the balancing weight based on an output of the sensor.

7. The device of claim 1, comprising a swivel arm being pivotally connected to the rotor for swiveling about the swivel axis and having a first end and a second end, wherein the receptacle is arranged at the first end and wherein the swivel axis is arranged at a distance from the second end.

8. The device of claim 7, wherein the balancing weight is displaceably mounted at the swivel arm for a linear displacement in a dimension through the first and the second end.

9. The device of claim 7, wherein the swivel arm has an axis of inertia extending in a dimension through the first and second end, wherein in the first angular orientation the swivel arm is oriented such that the axis of inertia of the swivel arm is arranged in line with the spinning axis.

10. The device of claim 9 comprising the workpiece, wherein the workpiece has an axis of inertia, wherein the workpiece is mounted to the receptacle such that the axis of inertia of the workpiece is in line with the axis of inertia of the swivel arm.

11. The device of claim 9, wherein in the second angular orientation the swivel arm is oriented such that the axis of inertia of the swivel arm is arranged inclined relative to the spinning axis at an inclination angle.

12. The device of claim 1 comprising a workpiece, the workpiece being selected from a dental dentition model, a dental aligner or a dental restoration, the workpiece having preferably been built up in an additive manufacturing process, wherein the workpiece comprises a light hardenable material located on the surface of the workpiece.

13. The device of claim 1 further comprising a vacuum chamber formed by a collecting vessel and a closure for openably closing the collecting vessel.

14. The device of claim 1 further comprising a spinning drive for driving the rotor.

15. A process for cleaning a workpiece, the process comprising the steps of
providing the device as described in claim 1 with the workpiece having light curable material located on its surface being placed or fixed to the receptable,
spinning the workpiece at a rotation speed resulting in the removal of the light curable material from the surface of the workpiece.

\* \* \* \* \*